US 6,552,457 B2

(12) United States Patent
Uruma et al.

(10) Patent No.: US 6,552,457 B2
(45) Date of Patent: Apr. 22, 2003

(54) SUPPORT STRUCTURE FOR DRIVE SOURCE (75) Inventors: Naoki Uruma, Anjo (JP); Yasufumi Kojima, Gifu (JP); Makoto Ozeki, Obu (JP); Kenji Shimomura, Kariya (JP); Toshihiro Tanino, Hamamatsu (JP); Yousuke Natsume, Toyohashi (JP)

(73) Assignees: Denso Corporation, Kariya (JP); Asmo Co., Ltd., Kosai (JP)

( * ) Notice: Subject to any disclaimer, the term of this patent is extended or adjusted under 35 U.S.C. 154(b) by 0 days.

(21) Appl. No.: 09/818,701

(22) Filed: Mar. 27, 2001

(65) Prior Publication Data
US 2001/0026107 A1 Oct. 4, 2001

(30) Foreign Application Priority Data
Mar. 28, 2000 (JP) ......................... 2000-093014

(51) Int. Cl.⁷ .............................. H02K 5/00; H02K 5/24
(52) U.S. Cl. ............................ 310/91; 310/51; 310/89; 248/562
(58) Field of Search ............................ 310/89, 91, 51; 248/562, 615

(56) References Cited

U.S. PATENT DOCUMENTS

| 3,163,353 A | | 12/1964 | Petrie | 417/338 |
| 3,536,280 A | * | 10/1970 | Barlow | 248/676 |
| 3,830,595 A | * | 8/1974 | Carpenter et al. | 248/603 |
| 3,978,357 A | * | 8/1976 | Voelbel et al. | 188/181 R |
| 4,161,667 A | * | 7/1979 | Buckman et al. | 248/603 |
| 4,636,673 A | * | 1/1987 | McDonald | 310/91 |
| 4,643,386 A | * | 2/1987 | Chastine | 248/632 |
| 4,849,667 A | * | 7/1989 | Morrill | 248/674 |
| 5,336,046 A | | 8/1994 | Hashimoto et al. | 310/51 |
| 5,786,647 A | | 7/1998 | Vollmer et al. | 415/214.1 |
| 6,209,692 B1 | | 4/2001 | Pels et al. | 310/75 R |

FOREIGN PATENT DOCUMENTS

| DE | 42 33 941 | | 4/1993 | |
| DE | 43 34 124 | | 9/1994 | |
| DE | 196 31 384 | | 10/1997 | |
| GB | 2169754 | * | 7/1986 | H02K/5/24 |
| JP | 4-111261 | | 9/1992 | |
| JP | 5-91923 | | 12/1993 | |
| JP | 2-2578063 | | 5/1998 | |

OTHER PUBLICATIONS

Patent Abstracts of Japan, Publication No. 54058155 dated May 10, 1979.
Office action dated May 23, 2002 in corresponding German Patent Application No. 101 15 038.5 with translation.

* cited by examiner

Primary Examiner—Burton S. Mullins
(74) Attorney, Agent, or Firm—Harness, Dickey & Pierce, PLC (57) ABSTRACT A support structure for a drive source such as a motor of the blower is disclosed in which the generation of noise caused by the vibration of the motor is suppressed. The flange of a support member has a low-stiffness portion having a thickness smaller than a high-stiffness portion of the same flange. The low-stiffness portion is thus vibrated more easily than the high-stiffness portion. When the motor vibrates, therefore, the vibration rate of the low-stiffness portion increases beyond that of the high-stiffness portion, so that the low-stiffness portion vibrates considerably. The motor vibration is thus absorbed by the flange (support member) and the transmission of the motor vibration to a casing can be suppressed. As a result, the area of the sound source of the blower is decreased as a whole, thereby making it possible to suppress the generation of noise caused by the vibration of the motor.

4 Claims, 6 Drawing Sheets

Fig.10

# SUPPORT STRUCTURE FOR DRIVE SOURCE

BACKGROUND OF THE INVENTION

1. Field of the Invention

The present invention relates to a support structure for fixedly supporting a drive source such as an electric motor on a fixing member such as a casing through a support member such as a housing, and the invention is effectively applicable to the blower of an air-conditioning system for a vehicle.

2. Description of the Related Art

An electric motor used for the blower of an air-conditioning system for a vehicle (hereinafter referred to as the blower motor), as disclosed in Japanese Examined Utility Model Publication No. 2578063, for example, is fixedly supported on a blower casing (scroll casing) through a flange.

With the recent trend toward lower noise within the vehicular compartments, the noise from the blower motor has become conspicuous. This noise is generated mainly as the vibration of the blower motor is transmitted to the blower casing through a flange and the blower casing radiates the vibration as a sound. With the intention of reducing the vibration and noise, it has been proposed to replace the flange of metal, which is conventionally used, with a flange of resin and mount the blower motor on the flange through an elastic member such as rubber, but they are not sufficient.

Japanese Unexamined Utility Model Publication (Kokai) No. 4-111261, on the other hand, discloses a flange having a rib-like deflector, although the deflector is intended to prevent water from intruding into the motor and is not intended to suppress the vibration.

SUMMARY OF THE INVENTION

In view of this situation, the object of the present invention is to provide a support structure for suppressing the generation of noise caused by the vibration of a drive source such as an electric motor.

In order to achieve the aforementioned object, according to one aspect of the present invention, there is provided a support structure for a drive source, comprising a drive source (72) for generating the drive power and a support member (73) for supporting the drive source (72) and fixing the drive source (72) on a fixing member (74), wherein the stiffness of the drive source (72) side portion of the support member (73) is smaller than the stiffness of the fixing member (74) side portion of the support member (73).

As a result, the portion of the support member (73) having a smaller stiffness (which portion is hereinafter referred to as the low-stiffness portion in this embodiment) is more easily vibrated than the fixing member (74) side portion of the support member (73) (which portion is hereinafter referred to as the high-stiffness portion in this embodiment). Thus, the vibration rate of the low-stiffness portion is higher than that of the high-stiffness portion (73e), and the low-stiffness portion vibrates considerably.

Therefore, in the support structure according to this embodiment of the invention, the vibration of the drive source (72) is absorbed into the support member (73) so that the transmission of the vibration of the drive source (72) to the fixing member (74) can be suppressed. As a result, the area of the sound source is reduced as a whole, and the generation of the noise caused by the vibration of the drive source (72) can be suppressed.

According to another aspect of the invention, there is provided a support structure for a drive source, comprising a drive source (72) for generating the drive power and a support member (73) for supporting the drive source (72) and fixing the drive source (72) on a fixing member (74), wherein the elastic modulus of the drive source (72) side portion of the support member (73) is smaller than the elastic modulus of the fixing member (74) side portion of the support member (73).

As a result, the portion of the support member (73) having a smaller elastic modulus (which portion is hereinafter referred to as the low-stiffness portion in this embodiment) is more easily vibrated than the fixing member (74) side portion of the support member (73) (which portion is hereinafter referred to as the high-stiffness portion in this embodiment). Thus, the vibration rate of the low-stiffness portion is higher than that of the high-stiffness portion (73e), and the low-stiffness portion vibrates considerably.

Therefore, in the support structure according to this embodiment of the invention, the vibration of the drive source (72) is absorbed into the support member (73) so that the transmission of the vibration of the drive source (72) to the fixing member (74) can be suppressed. As a result, the area of the sound source is reduced as a whole, and the generation of the noise caused by the vibration of the drive source (72) can be suppressed.

According to still another aspect of the invention, there is provided a support structure for a drive source, comprising a drive source (72) for generating the drive power and a tabular support member (73) for supporting the drive source (72) and fixing the drive source (72) on the fixing member (74), wherein the thickness of the drive source (72) side portion of the support member (73) is smaller than the thickness of the fixing member (74) side portion of the support member (73).

As a result, the portion of the support member (73) having a smaller thickness (which portion is hereinafter referred to as the low-stiffness portion in this embodiment) is more easily vibrated than the fixing member (74) side portion of the support member (73) (which portion is hereinafter referred to as the high-stiffness portion in this embodiment). Thus, the vibration rate of the low-stiffness portion is higher than that of the high-stiffness portion (73e), and the low-stiffness portion vibrates considerably.

Therefore, in the support structure according to this embodiment of the invention, the vibration of the drive source (72) is absorbed into the support member (73) so that the transmission of the vibration of the drive source (72) to the fixing member (74) can be suppressed. As a result, the area of the sound source is reduced as a whole, and the generation of the noise caused by the vibration of the drive source (72) can be suppressed.

According to yet another aspect of the invention, there is provided a support structure for a drive source, comprising a drive source (72) for generating the drive power and a tabular support member (73) for supporting the drive source (72) and fixing the drive source (72) on a fixing member (74), wherein the drive source (72) side portion of the support member (73) includes a bellows portion (h) which comprises a portion which is partly bent and meanders.

As a result, the bellows portion (h) is more easily vibrated than the fixing member (74) side portion of the support member (73) (which portion is hereinafter referred to as the high-stiffness portion in this embodiment). Thus, the vibration rate of the bellows portion (h) is higher than that of the high-stiffness portion (73e), and the bellows portion (h) vibrates considerably.

Therefore, in the support structure according to this embodiment of the invention, the vibration of the drive source (72) is absorbed into the support member (73) so that the transmission of the vibration of the drive source (72) to the fixing member (74) can be suppressed. As a result, the area of the sound source is reduced as a whole, and the generation of the noise caused by the vibration of the drive source (72) can be suppressed.

Incidentally, the reference numerals in parentheses attached to the respective means represent correspondence to the specific means included in the embodiments described later.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 1:
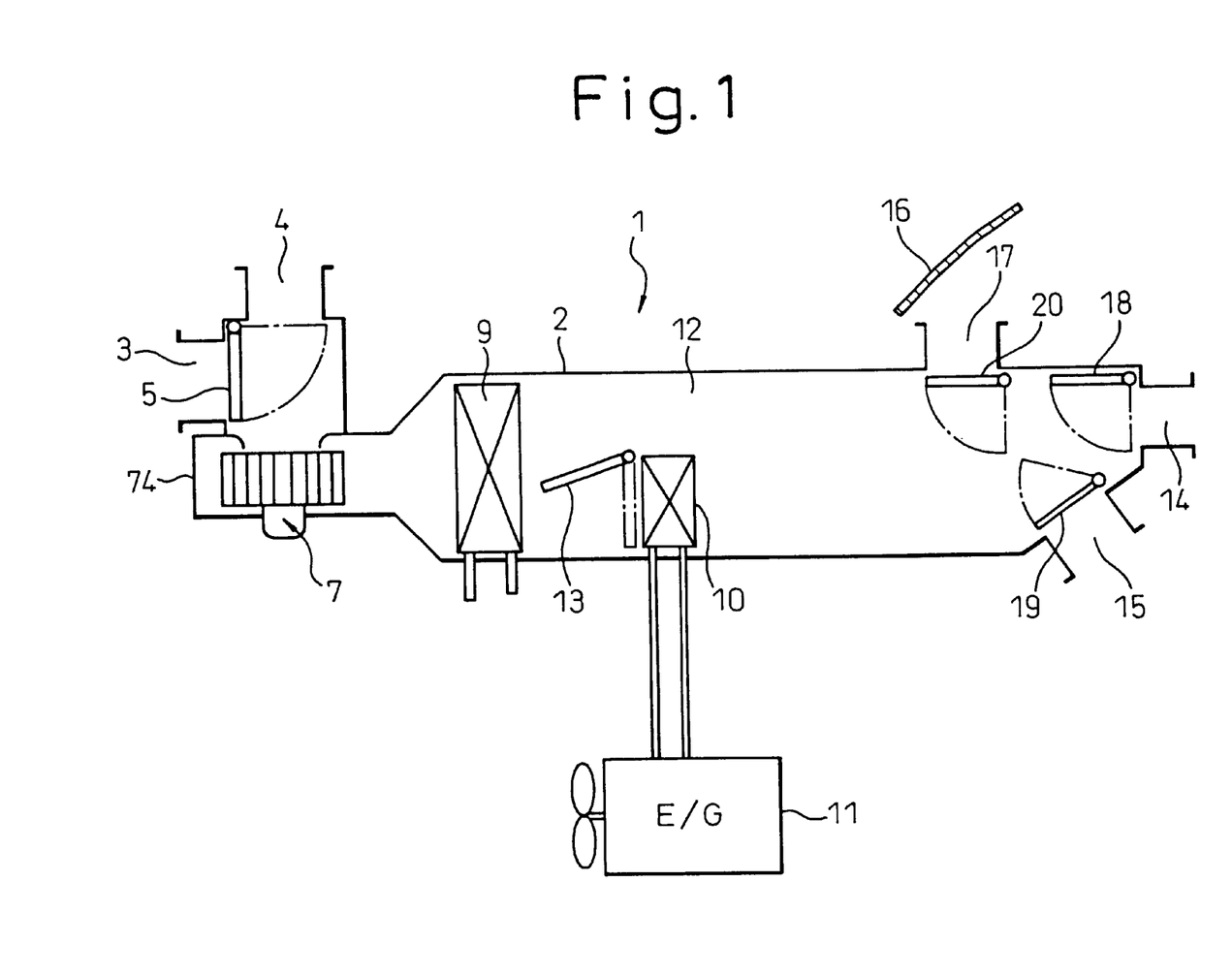
FIG. 1 is a diagram schematically showing an air-conditioning system for a vehicle.

In the embodiments described below, each support structure for a drive source according to the present invention is applied to a support structure of a blower motor for an air-conditioning system of a vehicle. FIG. 1 is a schematic diagram showing an air-conditioning system 1 of an vehicle having a water-cooled engine.

An internal air intake port 3 for sucking the internal air of the compartments and an external air intake port 4 for sucking the external air are formed in an upstream portion of an air-conditioning system casing 2 forming an air path. An intake port switching door 5 is also provided in an upstream portion of the air-conditioning system casing 2 for selectively opening/closing the intake ports 3 and 4. The intake port switching door 5 is opened/closed manually or by drive means such as a servo motor.

A filter (not shown) for removing dust from the air and a blower 7 are arranged downstream of the intake port switching door 5. The air introduced from the intake ports 3, 4 by the blower 7 is blown toward air outlets 14, 15, 17 described later.

An evaporator 9 making up air cooling means is arranged in the air path downstream of the blower 7. All the air blown by the blower 7 is passed through the evaporator 9. A heater core 10 making up air heating means is arranged in the air path downstream of the evaporator 9. The heater core 10 heats the air by using the cooling water of the engine 11 as a heat source. The blower in FIG. 1 is schematically shown and will be described in detail later.

The air-conditioning casing 2 is formed with a bypass 12 for bypassing the heater core 10. An air mix door 13 for regulating the temperature of the air blown into the compartments by adjusting the ratio of air flow rates between the air passing through the heater core 10 and the air passing through the bypass 12 is arranged in the air path upstream of the heater core 10.

A face air outlet 14 for blowing out the air-conditioned air to the upper half portion of the bodies of the occupants of the compartment, a foot air outlet 15 for blowing out the air to the feet of the occupants of the compartment and a defroster air outlet 17 for blowing out the air toward the inner surface of the windshield 16 are arranged in the furthest downstream portion of the air-conditioning casing 2.

Blowout mode switching doors 18, 19, 20 are arranged in the air path upstream of the air outlets 14, 15, 17, respectively. The blowout mode switching doors 18, 19, 20 are opened/closed manually or by drive means such as a servo motor.

Now, the blower 7 will be described.

Figure 2:
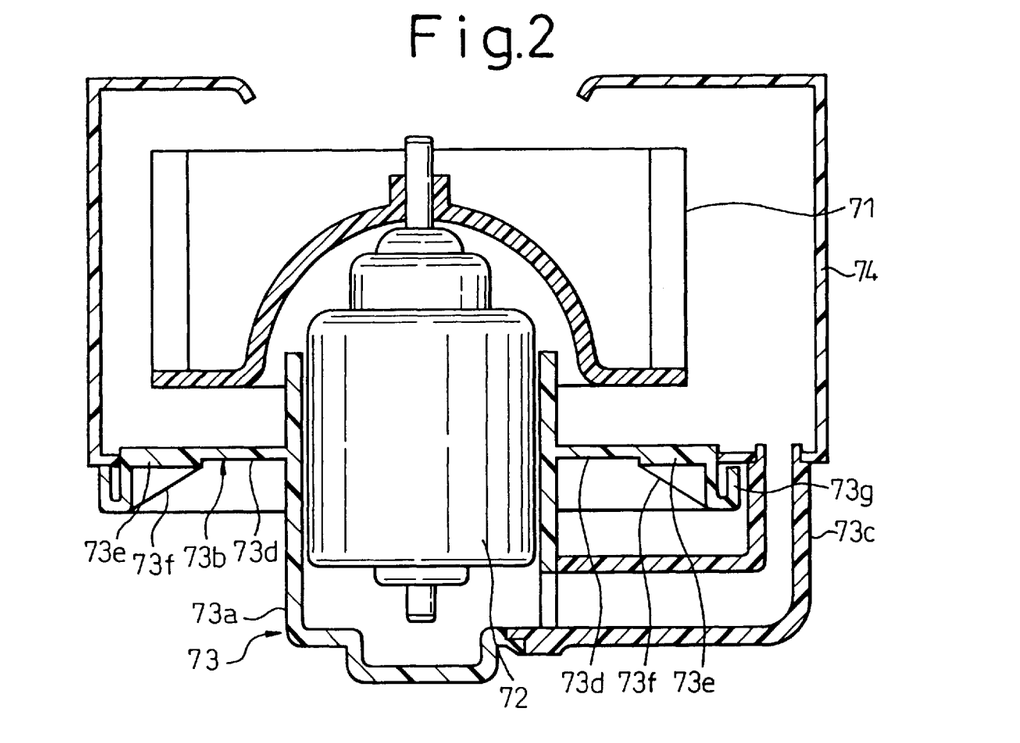
FIG. 2 is a sectional view showing a blower according to an embodiment of the invention.

FIG. 2 is a sectional view of a blower 7, in which numeral 71 designates an centrifugal multiblade fan (hereinafter referred to as the fan) having a multiplicity of blades around a rotary shaft for blowing out air by the centrifugal force. Numeral 72 designates a blower motor (drive source) for rotationally driving the fan 71. The blower motor 72 is fixedly supported on a scroll casing (fixing member) 74 through a support member 73 of resin.

The scroll casing (hereinafter referred to as the casing) 74, which encases the fan 71 therein, is of spiral type and collects the air blown out from the fan 71 to increase the pressure of the air.

The support member 73 includes a cylindrical (cup-shaped) motor casing 73a with an end thereof closed for encasing the blower motor 72 (hereinafter referred to as the motor 72) and a flange 73b extending radially outward over the whole periphery of the motor casing 73a. The two parts 73a, 73b are integrally formed of resin.

Numeral 73c designates a cooling pipe for introducing the cooling air for cooling the motor 72 from the casing 74. The cooling pipe 73c is formed as a separate part from the support member 73 and then assembled on the casing 74 and the support member 73 (motor casing 73a).

Figure 3:
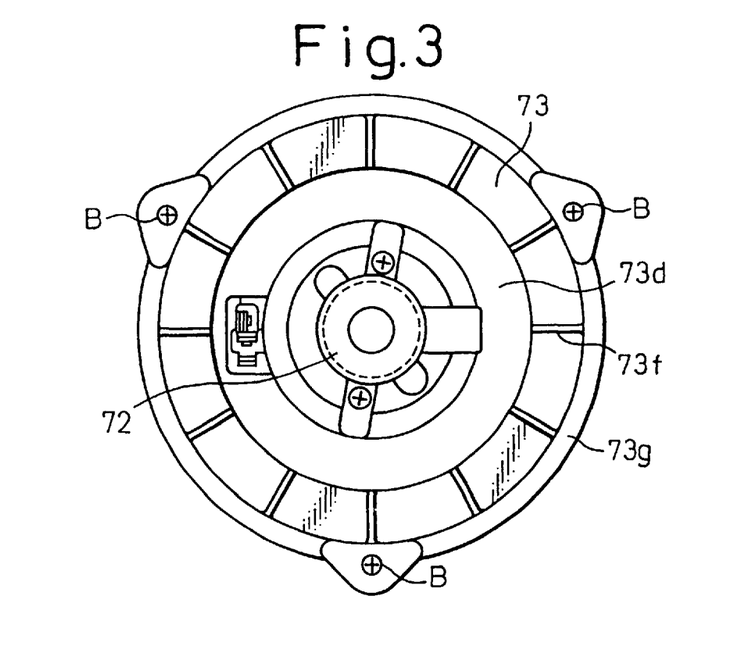
FIG. 3 is a bottom view of the blower according to an embodiment of the invention, viewing from the motor side.

The motor 72, as shown in FIG. 3, is fixed on the casing 74 by fastening the outer peripheral side (radially outer side) of the flange 73b to the casing 74 with a plurality of (three in this embodiment) bolts B.

As shown in FIG. 2, the portion of the flange 73b nearer to the motor 72 (the portion nearer to the center of the flange 73b) has a smaller thickness than the portion of the flange 73b nearer to the outer periphery (on the casing 74 side). Thus, the motor 72 side low-stiffness portion 73d of the flange 73b having a smaller stiffness than the outer peripheral side portion thereof is formed in an annular form (in a ring) around the motor casing 73a.

On the other hand, the outer peripheral side portion of the flange 73b (which portion hereinafter will be referred to as the high-stiffness portion 73e) having a larger thickness and a higher stiffness than the low-stiffness portion 73d is formed with a wall (rib) 73f substantially perpendicular to the high-stiffness portion 73e for a further improved stiffness. The entire outermost peripheral portion of the flange 73b (high-stiffness portion 73e) is formed with an annular recessed reinforcing rib 73g.

Now, the feature of this embodiment will be described below.

The thickness of the low-stiffness portion 73d is decreased as compared with the thickness of the high-stiffness portion 73e thereby to reduce the stiffness of the low-stiffness portion 73d as compared with the high-stiffness portion 73e. Therefore, the stiffness of the low-stiffness portion 73d is lower than that of the high-stiffness portion 73e.

As a result, the low-stiffness portion 73d is more easily vibrated than the high-stiffness portion 73e. Once the motor 72 vibrates, therefore, the low-stiffness portion 73d vibrates considerably so that the vibration rate v of the low-stiffness portion 73d is higher than that of the high-stiffness portion 73e, as shown by line A in FIG. 4.

Figure 4:
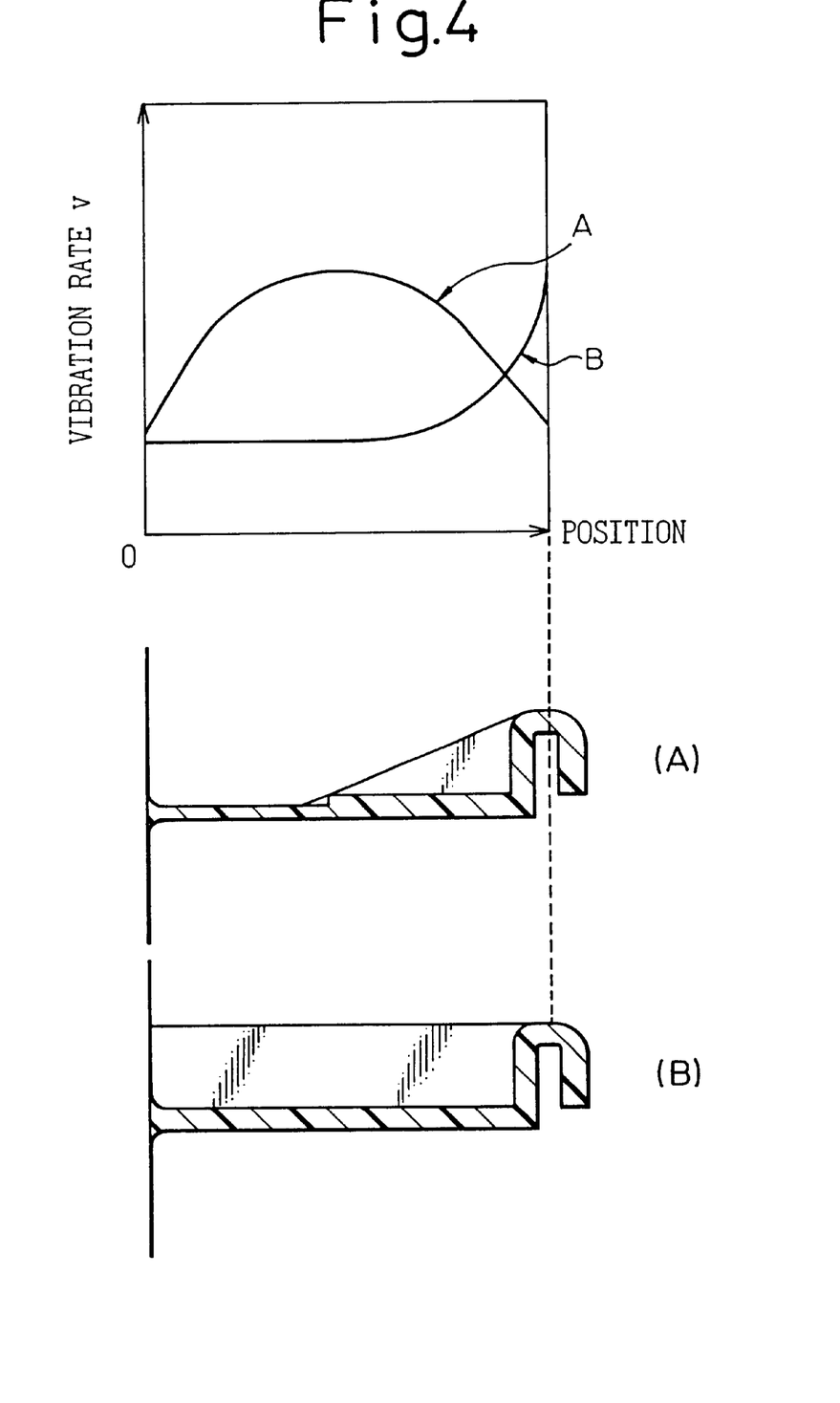
FIG. 4 is a diagram for explaining the result of a test conducted as to the vibration rate of the blower according to an embodiment of the invention.

In the conventional flange 73b having the same thickness from the motor casing 73a side portion to the radially outer portion thereof, on the other hand, as shown by line B in FIG. 4, the flange vibrates so that the vibration rate is maximum at the radially outer portion of the flange.

According to this embodiment, therefore, the vibration of the motor 72 is absorbed into the flange 73b (support member 73) and the transmission of the vibration of the motor 72 to the casing 74 can be suppressed. As a result, the sound source area of the blower 7 is reduced as a whole, thereby making it possible to suppress the generation of noise caused by the vibration of the motor 72.

Figure 5A:
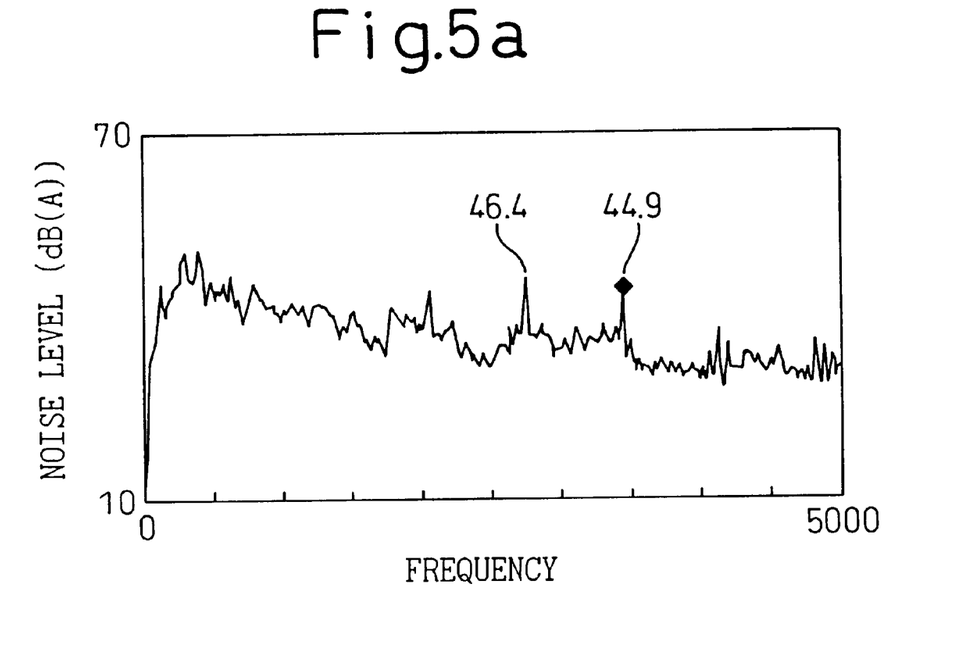
FIG. 5a is a graph showing the relation between the frequency and the noise level of the blower according to an embodiment of the invention.
Figure 5B:
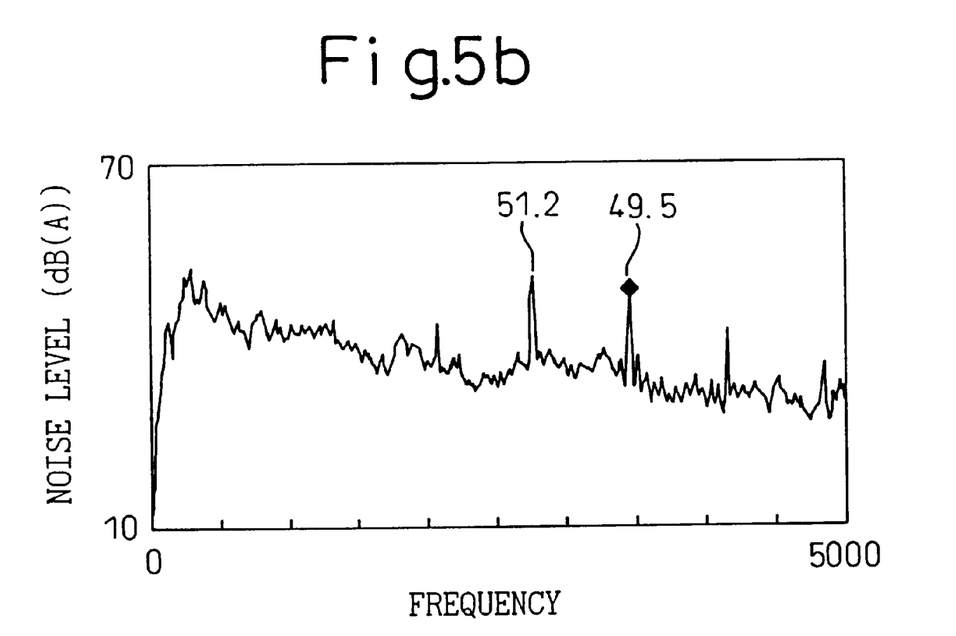
FIG. 5b is a graph showing the relation between the frequency and the noise level of the blower according to the prior art.

FIG. 5a is the test result showing the relation between the frequency and the noise level of the blower according to this embodiment. FIG. 5b is the test result showing the relation between the frequency and the noise level of the blower according to the prior art. As is clear from these graphs, it can be seen that the peak noise levels have been reduced by about 5 dB (A) in this embodiment.

Also, the low-stiffness portion 73d and the high-stiffness portion 73e, which are configured to have different thicknesses, can be easily formed by adjusting the resin molding die for the support member 73. Thus, the generation of noises caused by the vibration of the motor 72 can be suppressed inexpensively without increasing the production cost of the blower 7.

Figure 6:
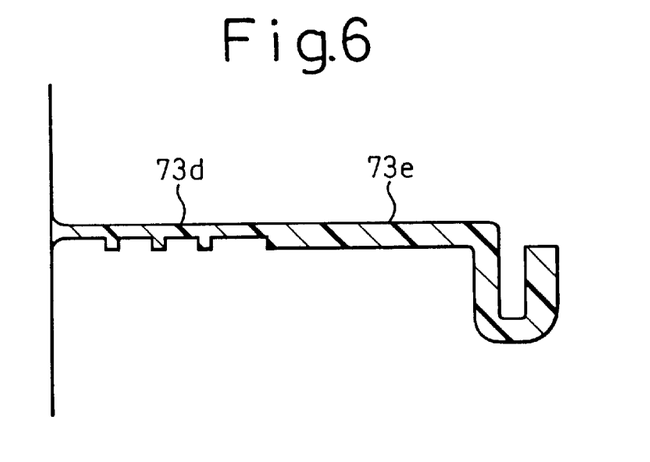
FIG. 6 is a schematic diagram showing a flange of a support member of the blower according to another embodiment of the invention.

In the embodiment described above, the thickness of the low-stiffness portion 73d is smaller than that of the high-stiffness portion 73e at uniform rate. The invention, however, is not limited to such a configuration but as shown in FIG. 6, the thickness of the low-stiffness portion 73d can be changed intermittently to reduce the stiffness of the low-stiffness portion 73d as compared with the high-stiffness portion 73e so that the low-stiffness portion 73d vibrates more easily than the high-stiffness portion 73e.

Figure 7:
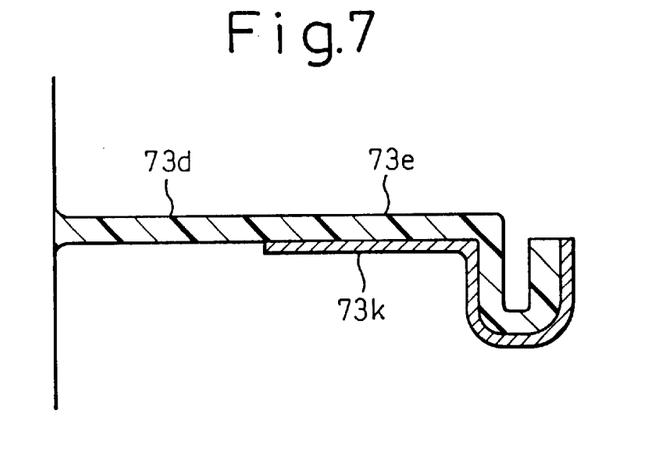
FIG. 7 is a schematic diagram showing a flange of a support member of the blower according to still another embodiment of the invention.

Further, as shown in FIG. 7, a separate member 73k made of a metal or resin may be assembled fixedly on the portion of the flange 73b corresponding to the high-stiffness portion 73e. In this way, the stiffness of the high-stiffness portion 73e is increased as compared with that of the portion corresponding to the low-stiffness portion 73d. Thus, the motor 72 side portion of the support member 73 can be rendered to vibrate more easily than the casing 74 side (outer peripheral side) portion of the support member 73.

Figure 8:
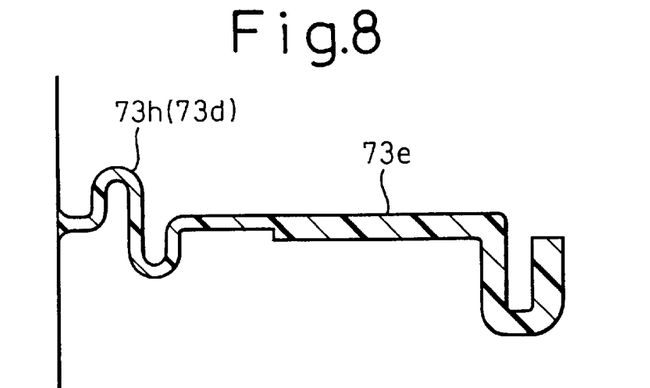
FIG. 8 is a schematic diagram showing a flange of a support member of the blower according to yet another embodiment of the invention.

Furthermore, as shown in FIG. 8, the motor side portion of the flange 73b may be partly bent to form a meandered bellows portion h thereby to constitute the low-stiffness portion 73d.

Figure 9:
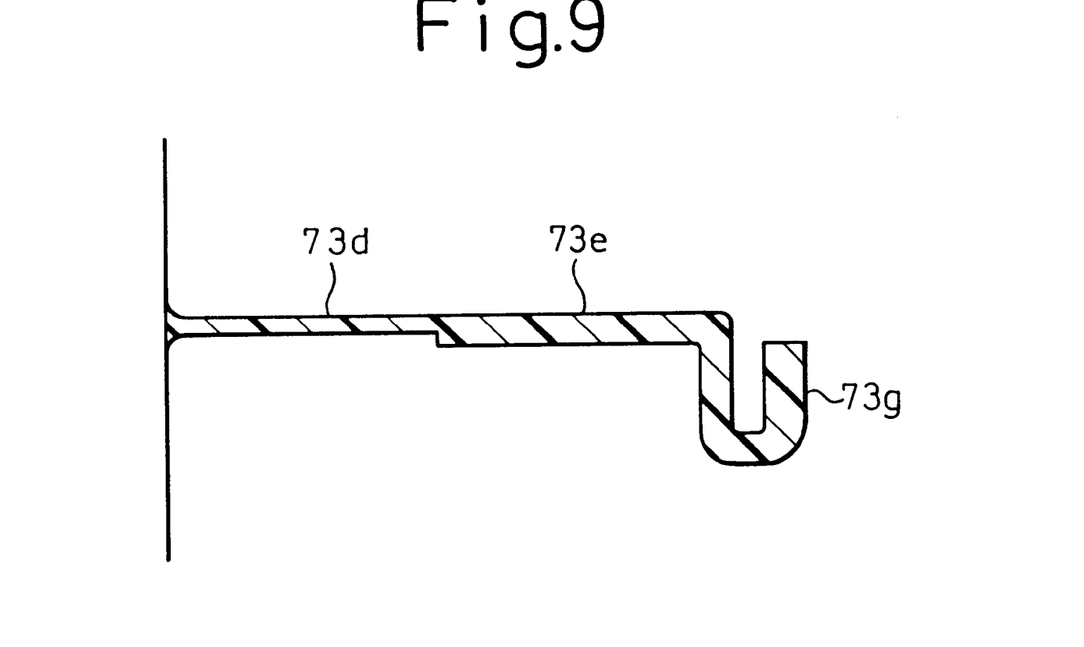
FIG. 9 is a schematic diagram showing a flange of a support member of the blower according to a further embodiment of the invention.

In addition, as shown in FIG. 9, the wall (rib) 73f may be omitted.

Figure 10:
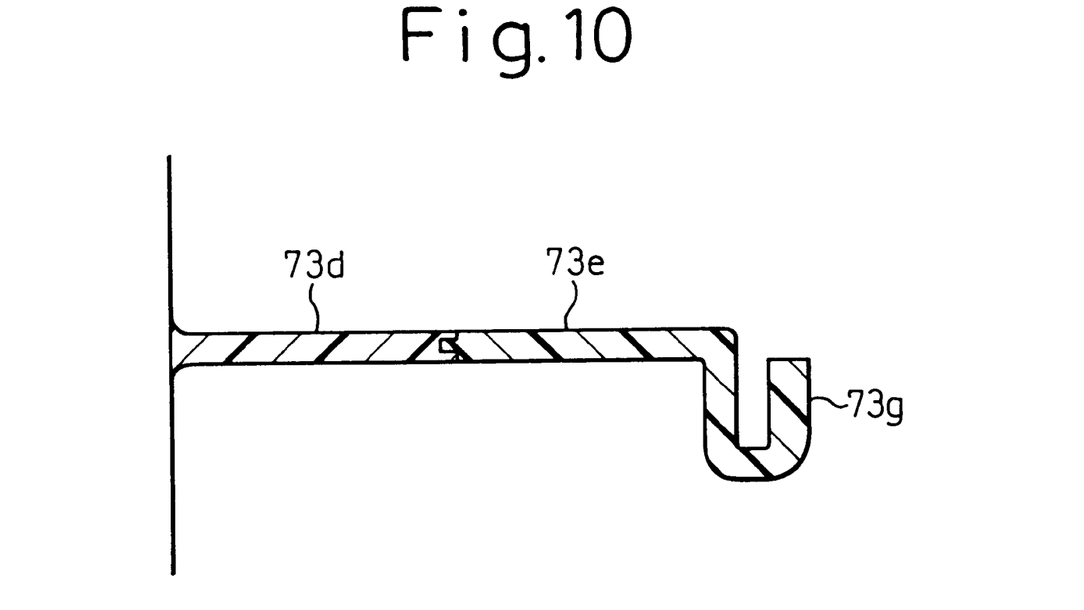
FIG. 10 is a schematic diagram showing a flange of a support member of the blower according to a still further embodiment of the invention.

As another alternative, as shown in FIG. 10, the low-stiffness portion 73d may be made of a different material from the high-stiffness portion 73e to reduce the elastic modulus of the low-stiffness portion 73d as compared with the high-stiffness portion 73e. By doing so, the low-stiffness portion is more easily vibrated than the high-stiffness portion, thereby making it possible to suppress the generation of noises caused by the vibration of the motor 72.

Instead of forming the support member 73 of the motor casing 73a and the flange 73b as in the aforementioned embodiment, the support member 73 may be formed only of the flange 73b without using the motor casing 73a with the flange 73b directly coupled to the motor 72.

While the invention has been described by reference to specific embodiments chosen for purposes of illustration, it should be apparent that numerous modifications could be made thereto by those skilled in the art without departing from the basic concept and scope of the invention.

What is claimed is:

1. A support structure for a drive source, comprising a drive source (72) having a drive axis for generating a drive power and a support member (73) tabularly extending and molded without a bent portion for supporting the drive source (72) and fixing the drive source (72) on a fixing member (74), wherein the thickness of the drive source side portion of the support member (73) which is measured in a direction parallel to the drive axis of the drive source is smaller than the thickness of the fixing member side portion of the support member (73) which is measured in a direction parallel to the drive axis of the drive source.

2. A support structure for an electric motor (72) used for a blower (7) of an air-conditioning system of a vehicle, wherein the motor is supported and fixed on a scroll casing (74) through a support member (73), the scroll casing (74) being provided on an air-conditioning system casing (2) forming an air path, and wherein the blower is arranged in an upstream portion of the air-conditioning system casing (2), the blower blowing the introduced air into the vehicle through a plurality of air outlets, the support structure comprising:

a centrifugal multiblade fan (71) having a multiplicity of blades around a rotary shaft for blowing air by the centrifugal force;

the electric motor for rotationally driving the fan;

the scroll casing, which encases the fan therein and collects the air blown out from the fan to increase the pressure of the air;

the support member (73) being made of resin through which the motor is supported and fixed on the scroll casing (74), wherein the support member comprises:

a motor casing (73a), which encases the motor;

a flange (73b) extending radially outward over the entire periphery of the motor casing, the flange and the motor casing being continuously and integrally formed of resin;

a plurality of fastening members for fastening the radially outer side of the flange to the scroll casing;

a low-stiffness portion (73*d*) arranged in the portion nearer to the center of the flange and formed in a ring form around the motor casing, the low-stiffness portion having a smaller thickness than the outer peripheral side portion of the flange nearer to the scroll casing, when the thicknesses are measured in a direction perpendicular to the radial direction, so that the stiffness of the motor side portion of the flange is smaller than the stiffness of the outer peripheral side portion of the flange;

a high-stiffness portion (73*e*) arranged at the peripherally outside portion of the low-stiffness portion in the flange, the thickness of the high-stiffness portion being larger than the thickness of the low-stiffness portion to make the high-stiffness portion more difficult to vibrate than the low-stiffness portion so that the vibration rate of the high-stiffness portion is lower than the vibration rate of the low-stiffness portion when the motor vibrates.

3. A support structure for an electric motor, according to claim 2, wherein the low-stiffness portion and the high-stiffness portion are formed to have different thicknesses by adjusting the resin molding die for the support member.

4. A support structure for an electric motor, according to claim 2, wherein the low-stiffness portion comprises a meandered bellows portion on the motor side portion of the flange, the meandered bellows portion being formed by partly bending a portion of the flange.

* * * * *